United States Patent [19]

Cockram et al.

[11] 4,330,628
[45] May 18, 1982

[54] ALKALI-RESISTANT GLASS FIBRES

[75] Inventors: David R. Cockram; Kenneth M. Fyles, both of Wigan, England

[73] Assignee: Pilkington Brothers Limited, Mereyside, England

[21] Appl. No.: 130,688

[22] Filed: Mar. 17, 1980

[30] Foreign Application Priority Data

Mar. 15, 1979 [GB] United Kingdom ............... 7909189

[51] Int. Cl.$^3$ .................. C03C 13/00; C03C 3/04; C04B 7/02
[52] U.S. Cl. ........................ 501/38; 106/99; 252/625; 252/629; 501/57; 501/58; 501/59; 501/63; 501/64
[58] Field of Search ............ 106/50, 52, 54, 99; 252/301.1 R, 301.1 W, 625, 629; 501/35, 36, 38, 63, 906, 64, 57

[56] References Cited

U.S. PATENT DOCUMENTS

| | | | |
|---|---|---|---|
| Re. 29,388 | 9/1977 | Atkinson | 106/50 |
| 2,805,166 | 9/1957 | Loffler | 106/52 |
| 2,988,421 | 6/1961 | Kemp et al. | 252/301.1 R |
| 3,060,041 | 10/1962 | Loewenstein | 106/50 |
| 3,132,033 | 5/1964 | Tiede | 106/50 |
| 3,460,954 | 8/1969 | Young | 106/50 |
| 3,783,092 | 1/1974 | Majumdar | 106/50 |
| 3,861,927 | 1/1975 | Kimura et al. | 106/50 |
| 3,947,542 | 3/1976 | Charlot | 252/301.1 R |
| 4,066,465 | 1/1978 | Mohri et al. | 501/38 |
| 4,109,051 | 8/1978 | Cockram | 106/99 X |
| 4,122,460 | 12/1978 | Humenik et al. | 106/50 X |
| 4,243,421 | 1/1981 | Kume | 106/50 |

FOREIGN PATENT DOCUMENTS 1290528 9/1972 United Kingdom .
1459385 12/1976 United Kingdom .
1460042 12/1976 United Kingdom .

OTHER PUBLICATIONS

Chem. Abstr. 80, Item 51688q, p. 248, "Extraction of Rare Earth Elements from Taiwan Monazite".
Pigkineton, C. S. et al., "Production of Rare Earth and Thorium Compounds from Monazite, Part I", Journal Soc. of Chemical Industry, London, vol. 66 (1947), pp. 387–394.

Primary Examiner—Helen M. McCarthy
Attorney, Agent, or Firm—Sughrue, Mion, Zinn, Macpeak and Seas

[57] ABSTRACT

Alkali-resistant glass fibres, in the form of continuous-filament for use as reinforcement in cementitious products, or in the form of glass wool, are given enhanced alkali resistance by the incorporation of $ThO_2$. The fibres are formed from a glass composition comprising, in weight percentages:

| | |
|---|---|
| $SiO_2$ | 50 to 75% |
| $ThO_2 + ZrO_2$ | 5 to 30% with $ThO_2$ at least 0.4% |
| $R_2O$ | 0 to 25% |
| $R'O$ | 0 to 40% |
| $R_2O + R'O$ | 10 to 40% |
| Rare earth oxides | 0 to 20% | the content of $ThO_2$ being at least 1% when the content of $ZrO_2$ is less than 6% but not exceeding 9.5% when $ZrO_2$ exceeds 8%, where $R_2O$ represents $Na_2O$, $K_2O$ or $LiO_2$, with $K_2O$ not exceeding 10% and $Li_2O$ not exceeding 5% and $R'O$ represents one or more of $MgO$, $CaO$, $SrO$, $BaO$, $ZnO$ and $MnO$.

13 Claims, No Drawings

ALKALI-RESISTANT GLASS FIBRES

BACKGROUND OF THE INVENTION

1. Field of the Invention

This invention relates to alkali-resistant glass fibres, both in the form of continuous filaments and chopped strands produced therefrom and in the form of non-continuous single filaments, e.g. glass wool. A particular application for such fibres, when in continuous-filament form, is as reinforcement in cementitious products. The invention accordingly also relates to fibre-reinforced cementitious products containing such continuous-filaments fibres.

2. Description of the Prior Art

Owing to the alkaline nature of cement, e.g. ordinary Portland cement, glass fibres for use as reinforcement therein must be resistant to alkalis if they are to retain an adequate degree of strength over long periods. Various proposals have been made in the past few years for glass compositions from which continuous-filament alkali-resistant glass fibres could be drawn. In general, such compositions include a substantial proportion of zirconia ($ZrO_2$) to provide alkali resistance. A particularly useful range of such compositions is disclosed and claimed in our British Pat. No. 1,290,528. While these known glass compositions generally provide fibres with greatly increased alkali resistance as compared with fibres made from the conventional E-glass used for reinforcing synthetic plastics, they nevertheless exhibit a slow deterioration in strength over long periods in the highly alkaline environment of ordinary Portland cement.

SUMMARY OF THE INVENTION

An object of the present invention is to provide alkali-resistant glass fibres with an enhanced resistance to alkalis.

We have now found that a proportion of thoria ($ThO_2$) can confer enhanced alkali resistance on glass fibres formed from a wide range of suitably formulated glass compositions, and that its use in zirconia-containing compositions is especially effective.

According to the invention, alkali-resistant glass fibres are formed from a glass composition comprising, in weight percentages:

| | |
|---|---|
| $SiO_2$ | 50 to 75% |
| $ThO_2 + ZrO_2$ | 5 to 30% with $ThO_2$ at least 0.4% |
| $R_2O$ | 0 to 25% |
| $R'O$ | 0 to 40% |
| $R_2O + R'O$ | 10 to 40% |
| Rare earth oxides | 0 to 20% | the content of $ThO_2$ being at least 1% when the content of $ZrO_2$ is less than 6% but not exceeding 9.5% when the content of $ZrO_2$ exceeds 8%, where $R_2O$ represents $Na_2O$, $K_2O$ or $Li_2O$, with $K_2O$ not exceeding 10% and $Li_2O$ not exceeding 5% and R'O represents one or more of $MgO$, $CaO$, $SrO$, $BaO$, $ZnO$ and $MnO$.

It has surprisingly been found that, in a composition which already has a degree of alkali resistance due to the presence of at least 6% $ZrO_2$, a proportion of $ThO_2$ as low as 0.4% can produce a useful improvement in the alkali resistance. Where the $ZrO_2$ content is less than 6%, however, the proportion of $ThO_2$ should be at least 1% and where $ZrO_2$ is absent the proportion of $ThO_2$ should be at least 5%, as will be understood from the preceding paragraph, in order to produce similar results. The quantities of $ThO_2$ and $ZrO_2$ may otherwise be varied in relation to one another, although, when $ZrO_2$ exceeds 8%, only a relatively small proportion of $ThO_2$ is required to give a good performance and the expense of using more than 9.5% $ThO_2$ is not justified. Thoria has similar glass-making properties to zirconia and the upper limit of 30% for $ThO_2+ZrO_2$ is effectively set by the difficulty of forming a glass with such a high content of constituents having high melting temperatures.

The total of $R_2O$ and R'O must be at least 10% in order to assist in melting the composition and thus to enable a glass to be formed, but should not exceed 40% to avoid devitrification.

Glass compositions as defined above which have melting characteristics which make them suitable for the production of glass fibres in the form of continuous filament generally have $R_2O$ between 10 and 25% and R'O from 0 to 15%. The glass compositions which have melting characteristics which make them suitable for the production of glass fibres in the form of wool generally have $R_2O$ from 0 to 10% and R'O between 15 and 40%.

Whilst a significant increase in alkali resistance of the glass fibres may be achieved by using as little as 0.4% of $ThO_2$, the use of higher proportions of thoria increases the alkali resistance more, and it is generally preferred to use 1% or more of $ThO_2$. On the other hand, because thorium is radioactive, it is generally desirable to keep the amount of $ThO_2$ present in the glass below 4% so that the radioactivity of the glass is maintained at an acceptably low level.

The $ThO_2$ may be incorporated in the glass batch used to form the glass fibres of the present invention in substantially pure form or in the form of a treated thorium ore. Thorium occurs naturally in combination with a mixture of rare earth metal oxides as an ore known as monazite. The naturally occurring ore may be treated to remove phosphate ions and then used without separation of the rare earth oxide mixtures. In the natural form, monazite ores contain from 4 to 8½% of $ThO_2$; removal of phosphate ions, mentioned above, increases the proportion of $ThO_2$ present to a value in the range 6% to 13%. Thus, to obtain the minimum amount of 0.4% $ThO_2$ required for the present invention, it is necessary to use over 3% of the ore (even using the ore rich in thorium); about 3% or more of rare earth oxides, in addition to the $ThO_2$, will consequently be incorporated in the glass. Of course, the $ThO_2$ will generally be used in amounts above the stated minimum and the source of thorium used may be an ore containing less than the maximum of 8½% $ThO_2$ referred to above. Thus, in general, the production of glass fibres in accordance with the invention using a mixture of $ThO_2$ and naturally occurring rare earth oxides derived from a monazite ore will result in the inclusion of more than 3%, say 5% or more, of a rare earth oxide mixture in the glass. The rare earth oxide mixture does not appear to have any deleterious effect on the glass and may be present in an amount of up to 20%.

The glass composition may further comprise up to 10% by weight of $TiO_2$, in order to help to avoid devitrification problems and, especially where R'O is absent, to keep the viscosity of the molten glass down to an acceptable level.

In addition to the constituents mentioned above, $Al_2O_3$ commonly occurs in the materials used for making up the batch of glass-making materials. $Al_2O_3$ is useful in alkali-free or low alkali glasses, giving some resistance to devitrification, particularly where the content of $ZrO_2+ThO_2$ is relatively low, i.e. below 8–9%. In such glasses, the content of $Al_2O_3$ may be up to 20%. In glasses stabilised against devitrification by the presence of alkali, $Al_2O_3$ is generally regarded as undesirable, tending to promote devitrification and when $R_2O$ exceeds 10%, $Al_2O_3$ should not exceed 10%.

$B_2O_3$ assists in reducing the glass-melting temperature and in reducing the viscosity of the molten glass, and so facilitates the formation of the glass fibres. It may accordingly be incorporated in amounts up to 10% by weight, though it is preferably kept below 5% in order to avoid adverse effects on the alkali resistance.

$Fe_2O_3$ is a common impurity in naturally occurring glass-making materials. It can be incorporated without loss of alkali resistance in amounts up to 5%, but is preferably kept below 3% by weight of the glass to avoid melting problems.

Fluorine assists in melting the glass and can be incorporated in amounts of up to 2% by weight. When used, fluorine is usually added in the form of calcium fluoride, sodium fluoride or potassium fluoride.

Other compatible constituents which are commonly used in glass making may also be incorporated in small amounts, for example up to a total of 6%, to make up the balance of the glass. For example, minor amounts of oxides of the transition elements may be incorporated. $P_2O_5$ may be incorporated to reduce viscosity, but as it tends to reduce alkali resistance it must be kept to small proportions and it is preferred to use $B_2O_3$ for this purpose. PbO and CdO may be incorporated in small quantities if desired. Small proportions of $As_2O_3$ or $Sb_2O_3$ may also be incorporated for fining purposes.

The preferred glass compositions for the production of glass fibres in accordance with the invention in the form of continuous filament comprise, in weight percentages:

| | |
|---|---|
| $SiO_2$ | 51 to 73% |
| $ZrO_2$ | 9 to 21% |
| $ThO_2$ | 0.5 to 2.5% |
| $R_2O$ | 10 to 21% |
| R'O | 0 to 13% |
| Rare earth oxides | 4 to 18% |
| $F_2$ | 0 to 2% | with $K_2O$ not exceeding 5% and $Li_2O$ not exceeding 3% and $R_2O+R'O$ from 14 to 30%. CaO is preferred as the principal R'O constituent. As the $ZrO_2$ content of the above compositions is increased above 9% it is desirable, in order to obtain compositions most suitable for the production of continuous filament fibre, to keep $R_2O$ up and R'O down. For example, when $ZrO_2$ is above 18%, $R_2O$ should be at least 14% and R'O should not exceed 3%.

The invention also resides in a fibre-reinforced cementitious product containing as reinforcement, alkali-resistant fibres as described above.

DETAILED DESCRIPTION OF THE INVENTION

Specific examples of glass compositions from which glass fibres according to the invention have been made are listed in the following Tables, with the results of accelerated tests of alkali resistance carried out on the fibres and on fibres of known glass compositions for comparison. The tests were carried out as follows:

Test 1: Ground samples of the glass were immersed in 0.4 N aqueous solutions of KOH, saturated with lime ($Ca(OH)_2$) at 50° C. and 80° C. The loss of soda ($Na_2O$) in each case after 100 hours immersion was measured as a percentage of the original soda content of the glass. This test was only used for the series of Table 1.

Test 2: (SIC test) Strands of continuous filament glass fibre were prepared and sized and their middle portions embedded in blocks of ordinary Portland cement, which were allowed to cure for 24 hours under conditions of 100% Relative Humidity at room temperature. The strand and cement blocks were then stored in water at 50° C. The tensile strengths of the strands were measured immediately after curing of the blocks and at periods of 14, 28, 56, 112 and 168 days thereafter. The initial strength immediately after curing (0 days) depends on a number of factors and, in assessing the effective alkali resistance of the glasses, it is the rate of decay of the strength that is significant.

Test 3: (SIS test) An even more severe accelerated test was carried out by immersing strands of the continuous filament glass fibres in a saturated solution of calcium hydroxide which also contained 15.48 gm/liter KOH and 5.16 gm/liter NaOH, at 80° C. and measuring the tensile strength of the strands after 3 days and 7 days immersion.

For the purpose of drawing glass fibres from molten glass by the continuous-filament process, it is necessary that the molten glass should have a viscosity of approximately $10^3$ poises, and it is consequently necessary to maintain the molten glass at the temperature at which it has this viscosity (known as the working or fiberising temperature) during the drawing process. It is also important that the liquidus temperature of the glass should be substantially below the working temperature to avoid the risk of devitrification of the fibres as they are formed. Measurements of the working temperature $T_W3$ and liquidus temperature $T_L$ were therefore made for most of the glasses listed in the following Tables.

Referring first to Table 1, this shows the effect of substituting thoria for zirconia in a known alkali-resistant glass composition in accordance with our British Pat. No. 1,290,528, (Glass No. 1 in Table 1) which is suitable for drawing into continuous filament fibre.

TABLE 1

SUBSTITUTION OF THORIA FOR ZIRCONIA IN KNOWN COMPOSITIONS

| Glass No. | Composition weight % | | | | | Working Temperature $T_W$ °C. | Liquidus Temperature $T_L$ °C. | Test 1 Sodium extract after 100 hours | | Test 2 Retained Strength MN/n² Strand in cement test (SIC at 50° C.) | | | | | | Test 3 Retained strength MN/m² Strand in solution test (SIS) @ 80° C. | |
|---|---|---|---|---|---|---|---|---|---|---|---|---|---|---|---|---|---|
| | $SiO_2$ | $Na_2O$ | CaO | $ZrO_2$ | $ThO_2$ | | | 50° C. | 80° C. | 0d | 14d | 28d | 56d | 112d | 168d | 3d | 7d |
| 1 | 62.8 | 14.8 | 5.6 | 16.8 | zero | 1300 | 1200 | 0.11 | 0.30 | 1244 | 770 | 618 | 498 | 428 | 382 | 540 | 400 |
| 2 | 62.9 | 14.6 | 5.5 | 16.6 | 0.4 | 1300 | 1200 | — | — | 1046 | 860 | 669 | 560 | — | — | 646 | 501 |
| 3 | 62.6 | 14.5 | 5.5 | 16.3 | 1.0 | 1300 | 1200 | 0.125 | 0.30 | 1343 | 918 | 715 | 606 | 495 | 495 | 670 | 526 |
| 4 | 62.3 | 14.5 | 5.5 | 15.7 | 2.0 | 1300 | 1220 | 0.11 | 0.32 | 1328 | 951 | 734 | 640 | 549 | 477 | 698 | 604 |
| 5 | 61.7 | 14.3 | 5.4 | 14.7 | 3.9 | 1300 | 1210 | — | — | 1220 | 947 | 771 | 647 | 588 | 564 | 763 | 548 |
| 6 | 60.4 | 14.0 | 5.3 | 12.6 | 7.7 | 1300 | 1120 | 0.07 | 0.21 | 1340 | >928 | >910 | 889 | 728 | 658 | >972 | 1059 |
| 7 | 55.8 | 12.9 | 4.9 | 5.0 | 21.3 | 1300 | 1300 | — | — | 1320 | — | 993 | 964 | 843 | 662 | 972 | 750 |
| 8 | 52.8 | 12.3 | 4.7 | zero | 30.3 | — | — | — | — | NO GLASS | | | | | | — | — |

The 16.8 weight % $ZrO_2$ in glass No. 1 corresponds to 9 mol %, and glasses Nos. 2 to 8 represent the substitution of 0.1, 0.25, 0.5, 1.0, 2.0, 6.0 and 9.0 mols $ThO_2$ respectively for corresponding molar porportions of $ZrO_2$. It will be seen that with only 0.4 weight % $ThO_2$ (0.1 mol %) the glass fibres exhibited considerably improved alkali resistance, and further substitutions of $ThO_2$ produced additional improvements in the alkali resistance. With substitution of up to 7.7 weight % $ThO_2$ (2 mol %) in glasses Nos. 2 to 6 the liquidus temperature of the glass remained similar to that of glass No. 1. The viscosity of the molten glass also remained virtually constant, so that forming of these glasses into continuous filaments on a commercial scale should present little problem from the aspect of fiberizing temperature or devitrification. Glass No. 7, with 21.3 weight % $ThO_2$ (6.0 mol %) proved to have a high liquidus temperature but could be useful for making glass wool. With more than 30% by weight $ThO_2$ (9.0 mol %) in glass No. 8, however, it was no longer possible to form the constituents into a glass.

The > symbols in relation to retained strength values indicate that the samples in question broke outside the cement block (in the SIC test) or outside the gauge length (in the SIS test) and thus did not exhibit their full strength.

Table II illustrates the effect of reducing the $ZrO_2$ content in a glass (glass No. 3 from Table I) which contains 1% $ThO_2$. The results for glass No. 1 are repeated for comparison.

TABLE II

REDUCTION OF ZIRCONIA IN A GLASS CONTAINING 1 WEIGHT % THORIUM

| Glass No. | Composition weight % | | | | | Working Temperature $T_W$ °C. | Liquidus Temperature $T_L$ °C. | Test 2 Retained strength MN/m² strand in cement test (SIC) at 50° C. | | | | | | Test 3 Retained strength MN/m² strand in solution test (SIS) at 80° C. | |
|---|---|---|---|---|---|---|---|---|---|---|---|---|---|---|---|
| | $SiO_2$ | $Na_2O$ | CaO | $ZrO_2$ | $ThO_2$ | | | 0d | 14d | 28d | 56d | 112d | 168d | 3d | 7d |
| 1 | 62.8 | 14.8 | 5.6 | 16.8 | zero | 1300 | 1200 | 1244 | 770 | 618 | 498 | 428 | 382 | 540 | 400 |
| 3 | 62.6 | 14.5 | 5.5 | 16.3 | 1.0 | 1300 | 1200 | 1343 | 918 | 715 | 606 | 495 | 495 | 670 | 526 |
| 9 | 68.5 | 15.1 | 5.7 | 9.7 | 1.0 | 1280 | 1090 | 1281 | 753 | 673 | 598 | — | — | 546 | 418 |
| 10 | 70.1 | 15.3 | 5.8 | 7.8 | 1.0 | 1275 | — | 1013 | 843 | 666 | 590 | 447 | 365 | 434 | 221 |
| 11 | 71.9 | 15.4 | 5.8 | 5.9 | 1.0 | 1270 | 970 | 1036 | — | 575 | 500 | 390 | — | 357 | 244 |
| 12 | 75.3 | 15.7 | 5.9 | 2.0 | 1.0 | 1255 | 1110 | 806 | — | 435 | 380 | — | — | — | — |

It will be seen from Table II that the alkali resistance deteriorated slightly with reduced quantities of zirconia but remained comparable with that of glass No. 1 until the content of $ThO_2 + ZrO_2$ fell below 5%, in glass No. 12, where the results indicate that a substantial proportion of alkali resistance has been lost. It will be realised that glass No. 12 lies outside the scope of the invention, which requires that the $ThO_2 + ZrO_2$ content should be at least 5%, whereas in glass No. 12 $ThO_2 + ZrO_2 = 3.1\%$.

Table III illustrates the effect on the alkali resistance of inclusion of thorium in various glass systems, the results for glass No. 1 from Table I being again incorporated for comparison.

TABLE III

EFFECTS OF THORIUM IN VARIOUS GLASS SYSTEMS

| Glass No. | Composition weight % | | | | | | | | | | | | | | |
|---|---|---|---|---|---|---|---|---|---|---|---|---|---|---|---|
| | $SiO_2$ | $Na_2O$ | $K_2O$ | MgO | CaO | ZnO | $B_2O_3$ | $Al_2O_3$ | $P_2O_5$ | $La_2O_3$ | $CeO_2$ | $Nd_2O_3$ | $Pr_6O_{11}$ | $ZrO_2$ | $ThO_2$ |
| 1 | 62.8 | 14.8 | — | — | 5.6 | — | — | — | — | — | — | — | — | 16.8 | — |
| 13 | 53.6 | 18.2 | 0.3 | — | — | — | 1.7 | 0.6 | 5.6 | — | — | — | — | 20.0 | — |
| 14 | 51.2 | 17.5 | 0.3 | — | — | — | 1.6 | 1.1 | 5.4 | — | — | — | — | 15.7 | 7.2 |
| 15 | 52.9 | 4.0 | — | 3.2 | 26.0 | — | — | — | — | — | — | — | — | 13.9 | — |
| 16 | 50.7 | 3.8 | — | 3.1 | 24.9 | — | — | — | — | — | — | — | — | 9.4 | 8.1 |
| 17 | 59.8 | — | — | 13.2 | — | 5 | 2 | 20 | — | — | — | — | — | — | — |

TABLE III-continued

EFFECTS OF THORIUM IN VARIOUS GLASS SYSTEMS

| | | | | | | | | | | | | | | |
|---|---|---|---|---|---|---|---|---|---|---|---|---|---|---|
| 18 | 54.3 | — | — | 12.4 | — | 4.7 | 1.9 | 18.8 | — | — | — | — | — | 8.0 |
| 19 | 61.0 | 11.3 | 2.6 | — | 0.8 | — | 2.9 | 1.4 | 6.0 | 4.6 | 7.2 | 2.3 | — | — | — |
| 20 | 56.1 | 10.7 | 2.5 | — | 0.7 | — | 2.8 | 1.3 | 5.7 | 4.3 | 6.8 | 2.2 | — | — | 7.0 |
| 21 | 72.6 | 13.1 | 0.6 | 3.9 | 7.9 | — | — | 1.3 | — | — | — | — | — | — | — |
| 22 | 66.4 | 12.3 | 0.6 | 3.7 | 7.4 | — | — | 1.2 | — | — | — | — | — | — | 8.3 |
| | | | | | SrO | | F$_2$ | | | | | | | | |
| 23 | 55.0 | 0.2 | 0.8 | 0.5 | 21.5 | 0.3 | 6.6 | 14.6 | 0.6 | — | — | — | — | — | — |
| 24 | 50.2 | 0.2 | 0.8 | 0.5 | 20.3 | 0.3 | 6.2 | 13.8 | 0.6 | — | — | — | — | — | 7.8 |

| Glass No. | Liquidus temperature T$_L$ °C. | Working temperature T$_W$3° C. | Strand in cement test (SIC) at 50° C. | | | | | | SIS test at 80° C. | |
|---|---|---|---|---|---|---|---|---|---|---|
| | | | 0d | 14d | 28d | 56d | 112d | 168d | 3d | 7d |
| 1 | 1200 | 1300 | 1244 | 770 | 618 | 498 | 428 | 382 | 540 | 400 |
| 13 | 1140 | 1280 | 1200 | 608 | 443 | 351 | — | — | — | — |
| 14 | 1040 | 1280 | 882 | 776 | 722 | 595 | — | — | 821 | — |
| 15 | 1300 | | 1254 | 507 | 398 | 419 | — | — | 462 | 339 |
| 16 | >1250 | | 1261 | 921 | 761 | 623 | — | — | 1025 | 810 |
| 17 | >1300 | | >1600 | 519 | 463 | 428 | 401 | — | 57 | 46 |
| 18 | >1300 | | 1964 | 924 | 763 | 620 | — | — | 376 | 237 |
| 19 | — | | 907 | 417 | 367 | 293 | 179 | — | 10 | no strength |
| 20 | >1370 | | 940 | 680 | 512 | 471 | 394 | — | 289 | 150 |
| 21 | 1000 | 1210 | 1082 | 303 | 223 | 92 | — | — | 31 | 20 |
| 22 | 900 | 1210 | 1073 | 649 | 626 | >500 | — | — | >369 | >164 |
| 23 | 1090 | 1205 | 1087 | 485 | 396 | 348 | — | — | 94 | 45 |
| 24 | 1285 | | 1096 | 646 | 547 | 384 | 378 | — | 272 | 86 |

Glass No. 13 is a known glass disclosed in U.S. Pat. No. 3,861,927 of Kanebo K. K., for forming into continuous filament fibres for cement reinforcement, while glass No. 14 is the same as glass No. 13 with the substitution of 2 mols ThO$_2$ for a corresponding molar proportion of ZrO$_2$. It will be seen that the alkali resistance is thereby substantially improved, while the liquidus temperature is actually reduced.

Glass No. 15 is an example of a glass for production of glass wool, within the scope of our British Pat. No. 1,399,556, while glass No. 16 represents the substitution of 2 mols ThO$_2$ for a corresponding amount of ZrO$_2$, illustrating how ThO$_2$ can be used as a partial substitute for ZrO$_2$ in the glasses described in that Patent. Again the alkali resistance is substantially improved.

Glass No. 17 is an example of a magnesium-aluminosilicate glass from German Pat. No. 2219016, which could be used for production of glass wool, while glass No. 18 represents the substitution of 2 mol % ThO$_2$ for a corresponding proportion of SiO$_2$. Again the alkali resistance is substantially improved.

Glass No. 19 is a glass which could be formed into glass wool, incorporating a substantial proportion of rare earth oxides (lanthanides) as obtained by use of a natural rare earth phosphate ore. In spite of references in the literature which state that lanthanides improve alkali resistance, glass No. 19 was found to exhibit relatively low alkali resistance, probably due to the content of P$_2$O$_5$. Glass No. 20 shows the result of incorporating 2 mol % ThO$_2$, thereby producing considerably improved alkali resistance, of the same level as that of glass No. 1.

Glass No. 21 is a standard soda-lime-silica glass composition known as A-glass which can be drawn into continuous-filament fibre but has very little resistance to alkalis. Glass No. 22 is the same composition with the addition of 8.3 weight % ThO$_2$, which can be seen to give the fibres a resistance to alkalis similar to that of glass No. 1.

Glass No. 23 is the standard lime-alumina-silicate glass known as E-glass, which is commonly used for drawing into continuous-filament fibres for reinforcement of plastics. It has little resistance to alkalis, but when 7.8 weight % ThO$_2$ is added, as in glass No. 24, it will be seen that the alkali resistance is much improved, though its liquidus temperature is also increased so that it is more suitable for glass wool.

Table IV lists two further compositions for drawing into continuous-filament fibres (glasses Nos. 25 and 26) incorporating ThO$_2$ in glasses derived from glass No. 1. The results for glass No. 1 are again repeated for comparison. The analysis of glass No. 1 here shows minor proportions of Al$_2$O$_3$ and TiO$_2$, producing a slight drop in working temperature T$_W$3.

TABLE IV

FURTHER COMPOSITIONS

| Glass No. | Compositions Weight % | | | | | | | | | | | | | | |
|---|---|---|---|---|---|---|---|---|---|---|---|---|---|---|---|
| | SiO$_2$ | Li$_2$O | Na$_2$O | K$_2$O | MgO | CaO | Al$_2$O$_3$ | P$_2$O$_5$ | La$_2$O$_3$ | Nd$_2$O$_3$ | Pr$_6$O$_{11}$ | CeO$_2$ | TiO$_2$ | ZrO$_2$ | ThO$_2$ |
| 1 | 62.0 | — | 14.8 | — | — | 5.6 | 0.8 | — | — | — | — | — | 0.1 | 16.7 | — |
| 25 | 60.3 | 0.5 | 14.0 | 1.4 | 1.2 | 3.4 | 0.8 | — | — | — | — | — | 1.2 | 16.3 | 1 |
| 26 | 61.3 | 0.2 | 14.3 | 1.5 | 1.2 | 3.4 | 0.7 | 0.1 | 1.6 | 1.0 | 0.3 | 2.6 | 1.2 | 10.0 | 0.6 |

| Glass No. | Liquidus Temperature T$_L$ °C. | Working Temperature T$_W$3° C. | Retained Strength MN/m$^2$ SIC test at 50° C. | | | | | | SIS test at 80° C. | |
|---|---|---|---|---|---|---|---|---|---|---|
| | | | 0d | 14d | 28d | 56d | 112d | 168d | 3d | 7d |
| 1 | 1200 | 1295 | 1244 | 770 | 618 | 498 | 428 | 382 | 540 | 400 |
| 25 | 1200 | 1270 | 1154 | 869 | 832 | 704 | 576 | >442 | 827 | 640 |
| 26 | 920 | 1230 | 1354 | — | 689 | 641 | 550 | 492 | 639 | 509 |

Glass No. 25 is a glass of the same general type as glass No. 1, with minor quantities of Li$_2$O, K$_2$O, MgO and TiO$_2$ in addition to 1 weight % ThO$_2$ (0.25 mol %). It will be seen that the alkali resistance is substantially improved as compared with glass No. 1 and also appears better than the corresponding glass No. 3 in Table I, which contains a similar quantity of ThO$_2$.

Glass No. 26 is similar to glass No. 25, but with a proportion of a mixture of rare earth oxides, as would be obtained by use of a treated monazite ore, in place of some of the ZrO$_2$, which is thus reduced to 10 weight %, and with a slightly smaller proportion (0.6 weight %) of ThO$_2$. In spite of this low proportion of ThO$_2$, the alkali resistance is still very good and substantially better than that of glass No. 1, while the liquidus and working temperatures are substantially reduced.

It thus appears that a particularly marked improvement in the alkali resistance of the glass fibres can be obtained where ThO$_2$ is employed in conjunction with at least 10 weight % of ZrO$_2$. Nevertheless, as illustrated by the preceding Table III, it is evident that incorporation of ThO$_2$ in a wide variety of glasses can produce notable improvements in the alkali resistance of fibres formed therefrom.

To minimise danger from radioactivity during production of the glasses, it is advisable to prepared the batch of glass-making materials in agglomerated and consequently dust-free form, for example in the form of briquettes. No problem arises during melting of the glass and forming of the fibres. Where the fibres are produced as continuous filament, the multiple filaments are sized and combined into strands which are wound into "cakes". At the levels of ThO$_2$ incorporated in the fibre, these cakes do not form sources of radiation of sufficient intensity to give cause for concern.

The glass fibres can be incorporated into cementitious materials by the methods which are now conventional for this purpose, such as by simultaneous spraying of chopped strands of continuous filament glass fibres and of a thick cement slurry into a foraminous mould and subsequent de-watering under suction. The fibres may be incorporated in an amount to constitute from 2 to 10% by weight, preferably 5% by weight, of the total solids in the cementitous product.

Glass wool is not generally used on its own for cement reinforcement but it may be used, in conjunction with chopped strands of continuous filament fibres, in asbestos cement replacement, that is, in making cement products which have in the past been made using asbestos, rather than glass fibre, as a reinforcing fibre.

We claim:

1. Alkali-resistant glass fibres formed from a glass composition consisting essentially of, in weight percentages:

| | |
|---|---|
| SiO$_2$ | 50 to 75% |
| ThO$_2$ + ZrO$_2$ | 5 to 30% with ThO$_2$ being in the range of at least 0.4% up to 4% |
| R$_2$O | 0 to 25% |
| R'O | 0 to 40% |
| R$_2$O + R'O | 10 to 40% |
| Rare earth oxides | 0 to 20% |
| TiO$_2$ | 0 to 10% | the content of ThO$_2$ being at least 1% when the content of ZrO$_2$ is less than 6%, where R$_2$O represents Na$_2$O, K$_2$O or Li$_2$O, with K$_2$O not exceeding 10% and Li$_2$O not exceeding 5% and R'O represents one or more of MgO, CaO, SrO, BaO, ZnO and MnO.

2. Glass fibres according to claim 1, wherein the R$_2$O content is between 10 and 25% and the R'O content is from 0 to 15%.

3. Glass fibres according to claim 1, wherein the R$_2$O content is from 0 to 10% and the R'O content is between 15 and 40%.

4. Glass fibres according to claim 1, wherein the glass composition further comprises up to 20% Al$_2$O$_3$.

5. Glass fibres according to claim 1, wherein the glass composition further comprises up to 10% B$_2$O$_3$.

6. Glass fibres according to claim 1, wherein the glass composition further comprises up to 5% Fe$_2$O$_3$.

7. Glass fibres according to claim 1, wherein the glass composition further comprises up to 2% F.

8. Glass fibres according to claim 2 formed from a glass composition consisting essentially of, in weight percentages:

| | |
|---|---|
| SiO$_2$ | 51 to 73% |
| ZrO$_2$ | 9 to 21% |
| ThO$_2$ | 0.5 to 2.5% |
| R$_2$O | 10 to 21% |
| R'O | 0 to 13% |
| Rare earth oxides | 4 to 18% |
| F$_2$ | 0 to 2% | with K$_2$O not exceeding 5% and Li$_2$O not exceeding 3% and R$_2$O+R'O from 14% to 30%.

9. Glass fibres according to claim 8, wherein CaO is the principal R'O constituent.

10. Glass fibres according to claim 8 wherein ZrO$_2$ exceeds 18%, R$_2$O is at least 14% and R'O does not exceed 3%.

11. A fibre-reinforced cementitious product containing, as reinforcement, alkali-resistant glass fibres according to claim 2.

12. A cementitious product according to claim 11, wherein the glass fibres constitute from 2 to 10% by weight of the total solids in the product.

13. A cementitious product according to claim 12, wherein the glass fibres constitute substantially 5% by weight of the total solids.

* * * * *